United States Patent
Fronzek

(10) Patent No.: US 7,273,278 B2
(45) Date of Patent: Sep. 25, 2007

(54) INSTRUMENT PANEL WITH SIMULATED INSTRUMENTS

(75) Inventor: Harald Fronzek, Langwedel (DE)

(73) Assignee: Rheinmetall Defence Electronics GmbH, Bremen (DE)

(*) Notice: Subject to any disclaimer, the term of this patent is extended or adjusted under 35 U.S.C. 154(b) by 101 days.

(21) Appl. No.: 10/489,331

(22) PCT Filed: Jul. 12, 2002

(86) PCT No.: PCT/EP02/07766

§ 371 (c)(1),
(2), (4) Date: Aug. 6, 2004

(87) PCT Pub. No.: WO03/025511

PCT Pub. Date: Mar. 27, 2003

(65) Prior Publication Data

US 2004/0246200 A1    Dec. 9, 2004

(30) Foreign Application Priority Data

Sep. 14, 2001   (DE) ................ 101 45 294

(51) Int. Cl.
*G03B 21/00* (2006.01)
*G03B 21/56* (2006.01)
*B60Q 1/00* (2006.01)
*B60Q 1/26* (2006.01)
*G01D 11/28* (2006.01)

(52) U.S. Cl. .............. 353/14; 353/10; 353/12; 359/460; 345/9; 362/489; 362/503; 362/23

(58) Field of Classification Search ........... 353/10, 353/12–14; 359/460; 345/7, 9; 362/489, 362/503, 23; 349/11
See application file for complete search history.

(56) References Cited

U.S. PATENT DOCUMENTS

| 2,178,637 | A | * | 11/1939 | Link, Jr. ................... 353/14 |
| 2,824,954 | A | * | 2/1958 | Roper ...................... 40/546 |
| 2,848,830 | A | * | 8/1958 | De Courcey et al. ......... 40/546 |
| 3,162,375 | A | * | 12/1964 | Huston .................... 362/619 |
| 5,204,667 | A | * | 4/1993 | Inoue ........................ 345/7 |
| 5,361,165 | A | * | 11/1994 | Stringfellow et al. ....... 359/631 |
| 5,406,303 | A | * | 4/1995 | Salmon et al. ............ 345/75.1 |
| 5,825,338 | A | * | 10/1998 | Salmon et al. ................ 345/7 |
| 6,972,788 | B1 | * | 12/2005 | Robertson et al. .......... 348/187 |

FOREIGN PATENT DOCUMENTS

| DE | 199 61 572 A | | 7/2001 |
| FR | 2 689 651 A | | 10/1993 |
| GB | 2337630 A | * | 11/1999 |
| WO | WO92/19992 A | | 11/1992 |

* cited by examiner

*Primary Examiner*—W. B. Perkey
*Assistant Examiner*—Magda Cruz
(74) *Attorney, Agent, or Firm*—Venable LLP; Michael A. Sartori; Steven J. Schwarz

(57) ABSTRACT

The invention relates to an instrument panel for the operating state of a land, air or water vehicle, in particular for the cockpit of an airplane, comprising a number of display fields (13) for representing information, whereby, in order to provide an instrument panel, which may be produced and maintained in an economic manner, with realistic instrumentation, the display fields (13) are produced on a backlit sheet (11) by means of image projection and a mask (12) is overlaid on the backlit sheet (11), which comprises cutouts (14), congruent with the display fields (13).

8 Claims, 2 Drawing Sheets

INSTRUMENT PANEL WITH SIMULATED INSTRUMENTS

Figure 1:
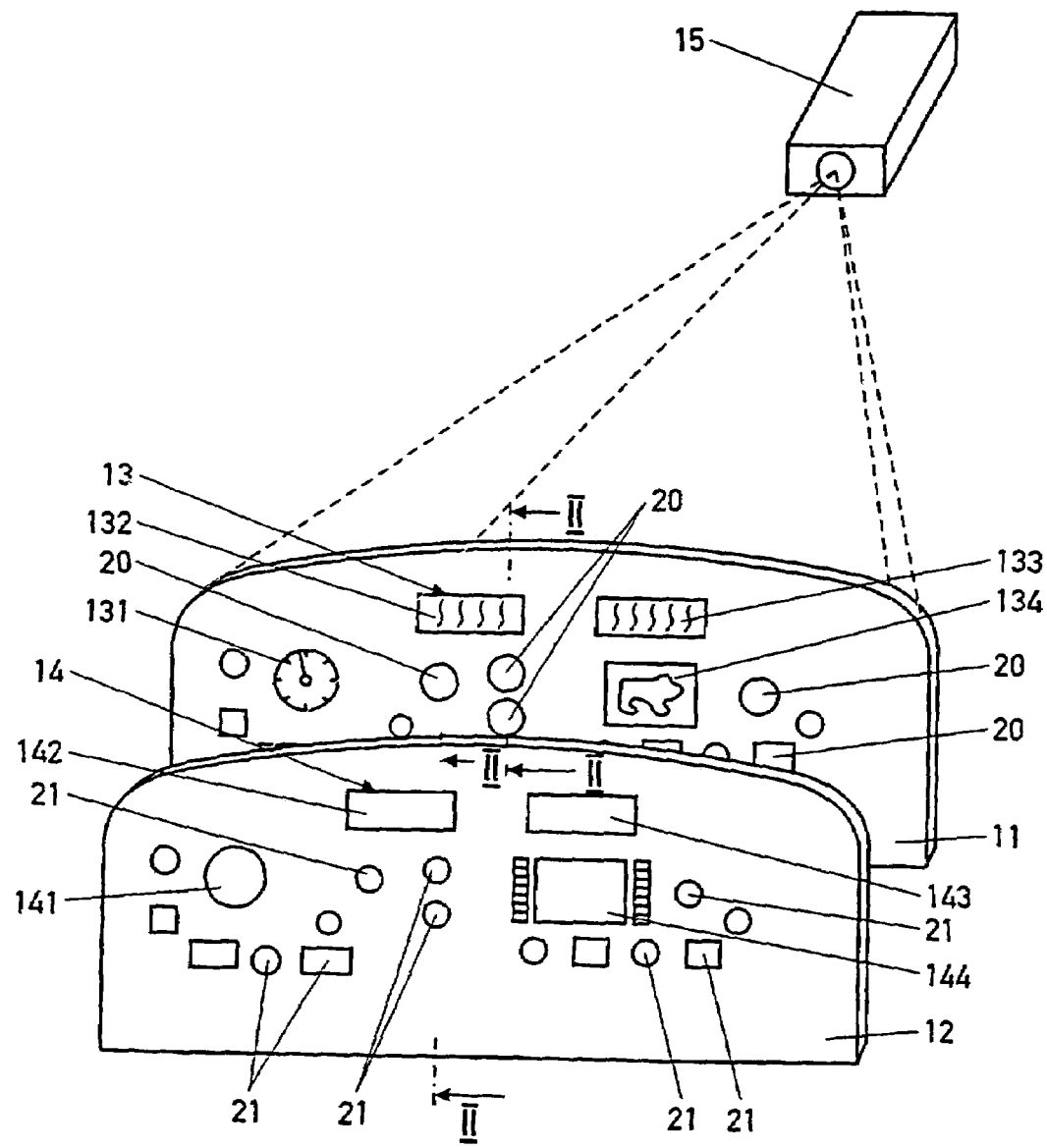

The invention relates to an instrument panel for the operating stand of a land, air or water vehicle, in particular for the cockpit of an airplane, of the generic type as defined in the preamble to claim 1.

Known instrument panels display information that is critically important to the driver or pilot for guiding the vehicle or airplane by means of individual instruments or built-in devices on the instrument panel, the display fields of which provide the driver or pilot with a readout of the current operating and navigation data, such as the water and oil temperature, operational interferences, the speed, flight horizon, weather information and the like. The instruments for the most part are purchased separately from different manufacturers and have different interfaces for integrating them into the complete vehicle or airplane operating system. The instrument panel furthermore has servo components, e.g. potentiometers and/or switches, which are used at least in part for turning on, switching and presenting the instruments.

Instrument panels of this type are not only used in vehicles or airplanes but also in simulators used to practice realistic vehicle or air plane guidance, for which the driver cabin or the cockpit is reproduced as closely as possible to the actual one. In particular the different makes of the display instruments with rather different interfaces, supplied by different manufacturers, represent a cost factor that considerably influences the simulator production costs.

It is the object of the present invention to create a realistic instrument panel of the aforementioned type, for use in particular in vehicle or flight simulators, which can be produced and maintained at low cost by avoiding the use of many different individual instruments and which can be modified with relatively little production expenditure to adapt it to changed or expanded requirements for the driver cabin or cockpit instruments.

This object is solved according to the invention with the features specified in claim 1.

The instrument panel according to the invention has the advantage that all desired combinations of instrument panel displays can be projected realistically onto the instrument panel with corresponding dimensions of backlit sheet and mask. Depending on the size of the instrument panel, one or several image projectors are used, which are controlled by an image generator in which the different display fields with their information are digitally generated.

The backlit sheet can be provided without problem with openings for inserting servo components assigned for the presetting and switching of display fields to the required depth in the backlit sheet, as well as for inserting additional independent real instruments into the instrument panel if desired.

The instrument panel according to the invention can be adapted quickly and cheaply to changes in the instrumentation of driver cabin and cockpit because the graphic display can be changed without problem by changing the software and because the changes in the arrangement of recesses, cutouts and openings for holding the associated servo components can be made at relatively low production costs.

The instrument panel according to the invention avoids the so far standard use of a multitude of instruments produced by different manufacturers with different interfaces and the necessity of using different maintenance services as well as the problem of obtaining replacement parts. Malfunctions seldom occur in the display fields and can be corrected easily through software intervention.

The instrument panel according to the invention is preferably installed in simulators for the realistic instrumentation of a vehicle driver cabin, an airplane cockpit or an operating station for a locomotive or streetcar since the already existing image generators used to create a simulated view for the driver or pilot can also be used for generating the display fields. However, the instrument panel according to the invention can also be used in actual vehicles or airplanes.

Useful embodiments of the instrument panel according to the invention, with advantageous modifications and designs of the invention, follow from the additional claims.

According to one advantageous embodiment of the invention, the cutouts that expose the different display fields on the backlit sheet are provided with a circumferential border on the mask that is fitted directly onto the backlit sheet. With a corresponding design of the border, the impression of a real display instrument can be created for each display field, such that it is impossible to differentiate between the "virtual" instrument panel and its real counterpart as far as the displayed instruments are concerned.

Figure 2:
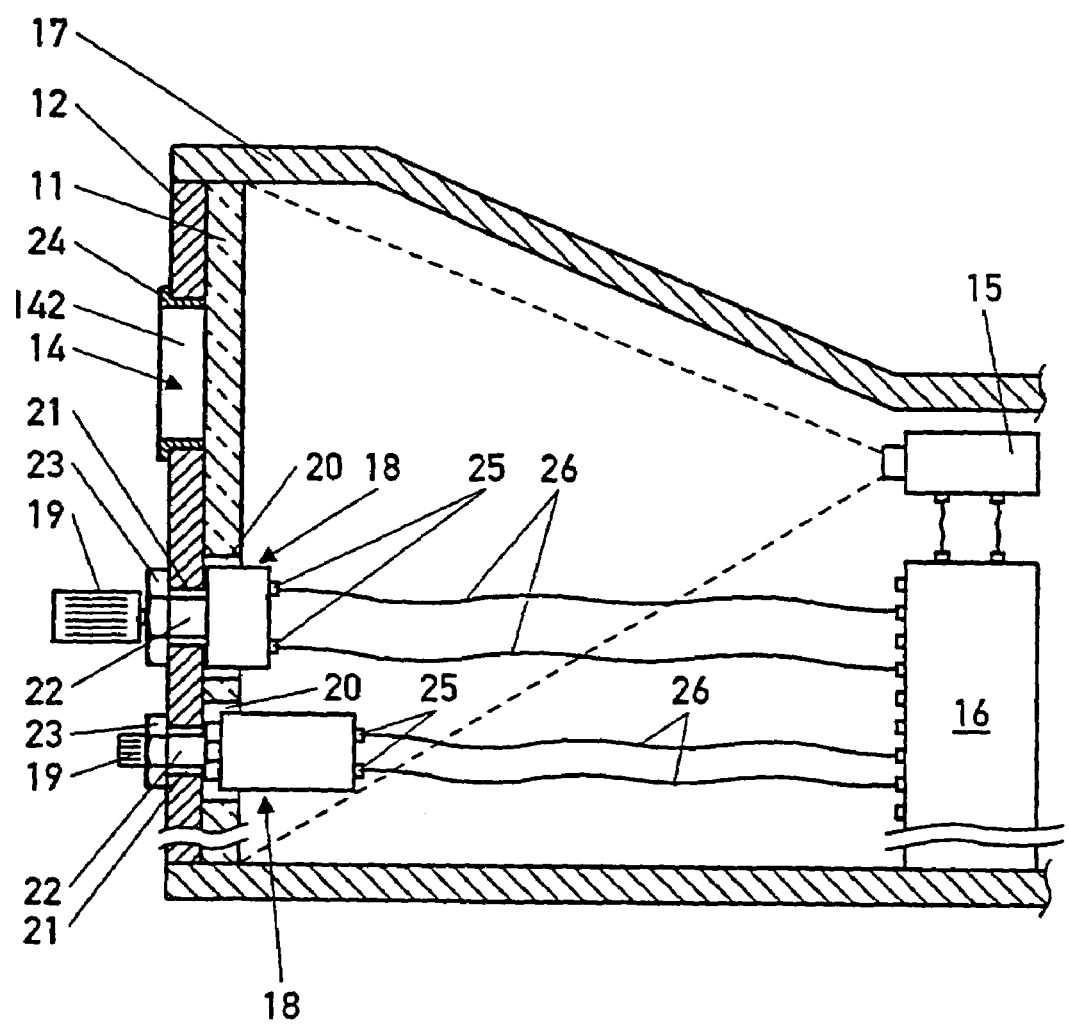

The invention is explained in further detail with the aid of an exemplary embodiment shown in the drawing, which shows in:

FIG. 1 A perspective representation of an instrument panel without housing, in an exploded and partially schematic view;

FIG. 2 A section along line II-II of the instrument panel shown in FIG. 1, which is enclosed by a housing.

The instrument panel for the cockpit of an airplane, in particular a helicopter, shown in part schematic and in an exploded view in FIG. 1 and shown in a longitudinal sectional view in FIG. 2, is provided with a plurality of instruments used for the navigation and monitoring of an orderly flight operation as well as a number of servo components for turning on, switching and presetting the instruments.

The instrument arrangement is realized by projecting the display fields 13 of the individual instruments with image projection onto a backlit sheet 11 of transparent plastic or glass and by placing a mask 12 of sheet metal or plastic, provided with cutouts 14 that are congruent with the display fields 13, directly onto the backlit sheet 11. The imaged individual display fields are given the references 131-134 in FIG. 1. The respectively congruent cutouts 14 in the mask 12 are given the references 141-144. The cutouts 14 respectively have a circumferential border 24 (FIG. 2), which is adapted to the respective border of a realistic instrument that is shown "virtually" on the instrument panel. For reasons of clarity, the mask 12 that is placed directly onto the backlit sheet 11—as shown in FIG. 2—is shown in FIG. 1 while lifted off the backlit sheet 11. If backlit sheet 11 and mask 12 are fitted against each other, the individual display fields 131-134 are congruent with the associated individual cutouts 141-144, meaning the cutout 141 coincides with the display field 131, the cutout 142 with the display field 132, etc.

The display fields 13 are projected with an image projector 15 onto the back side of backlit sheet 11 which is facing away from the mask 12. With larger instrument panels, two or more image projectors 15 can also be used for imaging the display fields 13. The image projector 15 is connected to an image projector 16 in which the display fields 13 together with the actual information shown on the display fields 13 is digitally generated. Image projector 15 and image projector 16 are enclosed by a housing 17 for which the front is adapted to the form of the instrument panel to be simulated and which is covered by the mask 12 that is placed over the backlit sheet 11.

The servo components 18 generally present in the instrument panel at least in part are used to turn on, switch and preset the display instruments, which are individualized by the display fields 13 with cutouts 14 and are correspondingly assigned to the display fields 13. These servo components 18, for example, are potentiometers or switches that can be operated with manual operating elements 19 in the form of rotary buttons or switching levers. FIG. 2 shows two servo components 18 of this type with operating element 19. The servo components 18, installed at the required depth, are mechanically secured in the mask 12 and project through the openings 20 in the backlit sheet 11. To mechanically secure the servo components 18, the mask 12 contains holes 21 that are inserted into the mask 12 coaxial to the openings 20 in the backlit sheet 11. The servo components 18 are fitted with a setscrew 22 through the cutouts 21 and are tightened on the mask 12 with a counter element fitted onto the setscrew 22. In the exemplary embodiment for servo components 18, shown in FIG. 2, each setscrew 22 is provided with an external thread and the counter element is designed as nut 23 which can be screwed onto the setscrew 22 until it is firmly seated. The control elements 19 project at a right angle from the mask 12. The servo components 18 are not shown in FIG. 1 so that only the holes 21 for fitting through corresponding setscrews, which are formed onto the servo components 18, can be seen in the mask 12. Depending on the setscrew design, the holes 21 have a circular or square and/or rectangular cross section. The electric adjuster outputs 25 are connected via respective electric signal lines 26 to the image generator 16, such that they can transmit the information on the adjustment of servo components 18 to the image generator 16. Based on the predetermined values, the image generation for the display fields 13 and the current information contained in these fields is then modified.

What is claimed is:

1. An instrument panel for an operating stand of a land, air or water vehicle, in particular a cockpit of an airplane, said panel comprising:

a backlit sheet (11) having front and back sides;

at least one image projector (15) that projects display fields (13) depicting images of instruments onto the back side of the backlit sheet (11), said display fields (13) being visible on the front side of the backlit sheet (11); and a separate mask layer (12) located over the front side of the backlit sheet and including cutouts (14) that are congruent with the display fields (13).

2. The instrument panel according to claim 1, characterized in that an image generator (16) that generates the display fields (13) is connected to the at least one image projector (15).

3. The instrument panel according to claim 1, characterized in that the cutouts (14) in the separate mask layer (12) are respectively framed in with a circumferential border (24).

4. The instrument panel according to claim 1, characterized in that servo components (18) with electric adjuster outputs (25) are provided, which are assigned at least in part to the display fields (13) and can be activated via manual operating elements (19), that the servo components (18) are mechanically secured to the separate mask layer (12), such that they project from it, and that the backlit sheet (11) has openings (20) through which the servo components (18) can project.

5. The instrument panel according to claim 4, characterized in that the electric adjuster outputs (25) of the servo components (18) are connected to the image generator (16).

6. The instrument panel according to claim 4, characterized in that the operating elements (19) on the servo components (18) are designed as rotary buttons or switching levers.

7. The instrument panel according to claim 1, characterized in that the backlit sheet (11) is produced from transparent plastic or glass.

8. The instrument panel according to claim 1, characterized in that the separate mask layer (12) is made of plastic or sheet metal.

* * * * *